United States Patent
Park et al.

(10) Patent No.: US 8,992,808 B2
(45) Date of Patent: Mar. 31, 2015

(54) METHOD OF MANUFACTURING PRE-SINTERED SI-MIXTURE GRANULE FOR POROUS SINTERED REACTION-BONDED SILICON NITRIDE, POROUS PRE-SINTERED GRANULE MANUFACTURED BY THE METHOD, AND METHOD OF MANUFACTURING POROUS SINTERED REACTION-BONDED SILICON NITRIDE

(75) Inventors: Young Jo Park, Changwon (KR); Wook Kyung Jang, Changwon (KR); In Hyuck Song, Changwon (KR)

(73) Assignee: Korea Institute of Machinery & Materials, Daejeon (KR)

(*) Notice: Subject to any disclaimer, the term of this patent is extended or adjusted under 35 U.S.C. 154(b) by 368 days.

(21) Appl. No.: 13/220,887

(22) Filed: Aug. 30, 2011

(65) Prior Publication Data

US 2012/0196125 A1    Aug. 2, 2012

(30) Foreign Application Priority Data

Jan. 27, 2011    (KR) .................. 10-2011-0008072

(51) Int. Cl.
| | |
|---|---|
| B29C 67/04 | (2006.01) |
| B29C 67/20 | (2006.01) |
| C04B 35/64 | (2006.01) |
| C04B 35/65 | (2006.01) |
| C04B 35/626 | (2006.01) |
| C04B 35/591 | (2006.01) |
| C04B 38/00 | (2006.01) |

(52) U.S. Cl.
CPC ......... *C04B 35/62695* (2013.01); *C04B 35/591* (2013.01); *C04B 35/62655* (2013.01); *C04B 38/009* (2013.01); *C04B 2235/3208* (2013.01); *C04B 2235/3222* (2013.01); *C04B 2235/3225* (2013.01); *C04B 2235/3418* (2013.01); *C04B 2235/428* (2013.01); *C04B 2235/46* (2013.01); *C04B 2235/5436* (2013.01); *C04B 2235/5481* (2013.01); *C04B 2235/656* (2013.01); *C04B 2235/6562* (2013.01); *C04B 2235/6567* (2013.01); *C04B 2235/661* (2013.01); *C04B 2235/77* (2013.01); *C04B 2235/96* (2013.01); *C04B 2235/9615* (2013.01)
USPC ............ 264/43; 264/46.4; 264/628; 264/647; 264/676

(58) Field of Classification Search
USPC .............................. 264/43, 464, 628, 647, 676
See application file for complete search history.

(56) References Cited

U.S. PATENT DOCUMENTS

| | | | | |
|---|---|---|---|---|
| 3,778,231 | A * | 12/1973 | Taylor ........................... | 423/344 |
| 4,127,630 | A * | 11/1978 | Washburn ...................... | 264/662 |
| 4,687,655 | A * | 8/1987 | Hunold et al. ................. | 423/344 |

(Continued)

*Primary Examiner* — Holly Le

(57) ABSTRACT

The present invention relates to a method of manufacturing a porous pre-sintered granule for a sintered reaction-bonded silicon nitride, to which a pressure forming technology can be applied to obtain a porous sintered reaction-bonded silicon nitride having high porosity and having a structure in which macropores and micropores coexist with each other, and to a porous pre-sintered granule manufactured by the method. The method includes the steps of: granulating a raw material comprising silicon and sintering additives including yttrium, aluminum and at least one alkali earth metal compound; and pre-sintering the granulated raw material at a temperature of 1300~1375° C. under an inert atmosphere. According to the present invention, a porous pre-sintered granule for porous sintered reaction-bonded silicon nitride, which can increase the air permeability and trapping efficiency by controlling the size of a pore channel such that macropores and micropores coexist, can be manufactured.

7 Claims, 16 Drawing Sheets

(56) References Cited

U.S. PATENT DOCUMENTS 5,166,106 A * 11/1992 Edler et al. ............... 501/97.2
5,401,450 A * 3/1995 Mitomo et al. ............... 264/676
6,846,764 B2 * 1/2005 Inoue et al. ............... 501/97.1

* cited by examiner

METHOD OF MANUFACTURING PRE-SINTERED SI-MIXTURE GRANULE FOR POROUS SINTERED REACTION-BONDED SILICON NITRIDE, POROUS PRE-SINTERED GRANULE MANUFACTURED BY THE METHOD, AND METHOD OF MANUFACTURING POROUS SINTERED REACTION-BONDED SILICON NITRIDE

BACKGROUND OF THE INVENTION

1. Technical Field

The present invention relates to a method of manufacturing a porous pre-sintered granule for a porous sintered reaction-bonded silicon nitride and a porous pre-sintered granule manufactured by the method. More particularly, the present invention relates to a method of manufacturing a porous pre-sintered granule, to which a pressure forming technology can be applied to obtain a porous sintered reaction-bonded silicon nitride having high porosity and having a structure in which macropores and micropores coexist with each other, and to a porous pre-sintered granule manufactured by the method.

2. Description of the Related Art

Porous silicon nitride materials have been widely used in the fields requiring excellent thermal, mechanical and chemical-resistant characteristics because they are light and have excellent strength, toughness, impact resistance, heat resistance, and corrosion resistance.

Conventionally, porous silicon carbide materials are generally used in the fields requiring excellent thermal, mechanical and chemical-resistant characteristics. However, these porous silicon carbide materials are problematic in that, since they have relatively low strength and impact resistance and high hardness, a mold is worn during a forming process, thus shortening the life span of the mold, and in that they are sintered at a high temperature of 2000° C. or more, thus causing an increase in production cost.

As described above, porous silicon nitride materials are promising materials that can be effectively used in filters for separating fine dust from diesel vehicles, catalyst carriers, heat insulation materials and the like, because they have excellent heat resistance, mechanical properties and corrosion resistance.

Conventionally, most research into silicon nitride materials has been focused on improving the mechanical and thermal properties thereof by densifying the microstructures thereof. Therefore, research into methods of manufacturing a porous silicon nitride material is relatively insufficient.

As examples of methods of manufacturing a porous silicon nitride material, Korean Unexamined Patent Application Publication No. 1995-702510 provide a method of manufacturing a porous silicon nitride ceramic material comprising a compound of silicon nitride ($Si_3N_4$) and a rare-earth element and/or a transition metal compound, wherein the porous silicon nitride ceramic material is used as a filter for removing foreign matter or a catalyst carrier. In this method, a molded powder mixture is heat-treated at a temperature of 1500° C. or more to obtain a porous silicon nitride ceramic material having a porosity of 30% or more.

Further, Korean Patent Registration No. 10-0311694 provides a method of manufacturing a sintered porous silicon oxynitride material used in a refractory tile or the like for a space shuttle. The method comprises the steps of: agglomerating a low-melting powder mixture containing $Si_3N_4$ 11~16 wt %, AlN 3~5 wt %, $Al_2O_3$ 35~45 wt % and $Y_2O_3$ 35~45 wt %; adding the agglomerated low-melting powder mixture to β-sialon silicon oxynitride powder containing $Si_3N_4$ 57~100 wt %, AlN 0~33 wt %, $Al_2O_3$ 0~9 wt %; and sintering the mixture at 1600~1700° C. for 1~8 hours.

Meanwhile, Japanese Unexamined Patent Application Publication No. H09-100179 discloses a method of manufacturing a porous silicon nitride material that can be used as a filter or a catalyst carrier. In this method, the porous silicon nitride material is manufactured by bringing a porous material containing silicon nitride as a main component into contact with acid and/or alkali to partially or entirely dissolve the components other than silicon nitride.

However, the above-mentioned methods are problematic in that they cannot be easily put to practical use because expensive silicon nitride is used as a raw material, and in that processes for forming pores are unpractical. For example, in the Korean Patent Registration No. 10-0311694, pores are formed by agglomerating low-melting powder and then mixing the agglomerated low-melting powder with high-melting powder. That is, the formation of pores depends on the size of the agglomerated low-melting powder. Therefore, this method is problematic in that it is difficult to maintain the form of the agglomerated low-melting powder when the agglomerated low-melting powder is mixed with the high-melting powder, and it is difficult to sufficiently mix them with each other when the form of the agglomerated low-melting powder is to be maintained constant, and in that it is difficult to consistently control processes, and costs increase. Further, in the Japanese Unexamined Patent Application Publication No. H09-100179, pores are formed by chemical treatment. However, this method is also problematic in that chemical treatment, as an additional process, must be conducted, and in that it is not easy to maintain the structure of silicon nitride when the components other than silicon nitride are dissolved.

Meanwhile, Korean Unexamined Patent Application No. 2009-107392 provides a method of manufacturing a porous pre-sintered granule by granulating a raw material containing silicon and sintering additives for preparing silicon nitride and then pre-sintering the granule of the raw material. The porous pre-sintered granule manufactured by this method has the necessary strength to keep the spherical morphology during the shaping process. Therefore, the porous pre-sintered granule can be used to manufacture porous sintered silicon nitride material having excellent air permeability and trapping efficiency. However, this method is also problematic in that optimal process conditions must be established to allow a porous pre-sintered granule to have sufficient strength during press forming so that the designed pore structure and porosity are maintained even after sintering.

SUMMARY OF THE INVENTION

Accordingly, the present invention has been made to solve the above-mentioned problems, and an object of the present invention is to provide a method of manufacturing a porous pre-sintered granule for porous sintered reaction-bonded silicon nitride having a pore structure including micropores and macropores and having a near-net shape after sintering, and the porous pre-sintered granule manufactured by the method.

Another object of the present invention is to provide a method of manufacturing porous sintered reaction-bonded silicon nitride having a near-net shape using the porous pre-sintered granule manufactured by the method.

In order to accomplish the above objects, an aspect of the present invention provides a method of manufacturing a porous pre-sintered granule for a sintered reaction-bonded silicon nitride, including the steps of: granulating a raw material including silicon and sintering additives containing yttrium, aluminum and at least one alkali earth metal compound; and pre-sintering the granulated raw material at a temperature of 1300~1375° C. under an inert atmosphere.

In the method, the sintering additive may be included in the raw material in an amount of 2~5 wt % based on an amount required for the complete nitridation of silicon.

Further, the alkali earth metal may be calcium (Ca).

Another aspect of the present invention provides a pre-sintered granule for a sintered reaction-bonded silicon nitride, including: silicon; and a sintering additive including yttria, alumina and an alkali earth metal oxide after nitriding the silicon and then sintering the nitrided silicon in a liquid phase at high temperature, wherein the pre-sintered granule is a spherical porous granule, and has a yield strength of 10 MPa or more.

Still another aspect of the present invention provides a method of manufacturing a porous sintered reaction-bonded silicon nitride, comprising the steps of: granulating a raw material comprising silicon and sintering additives including yttrium, aluminum and at least one alkali earth metal compound; pre-sintering the granulated raw material at a temperature of 1300~1375° C. under an inert atmosphere to prepare a porous granule; shaping the porous granule; nitriding the shaped porous granule under a nitridation atmosphere; and sintering the nitrided porous granule at a temperature of 1700~1900° C. under a nitrogen atmosphere.

In the method, the sintering additive may be included in the raw material in an amount of 2~5 wt % based on an amount required for the complete nitridation of silicon.

Further, the alkali earth metal may be calcium (Ca).

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
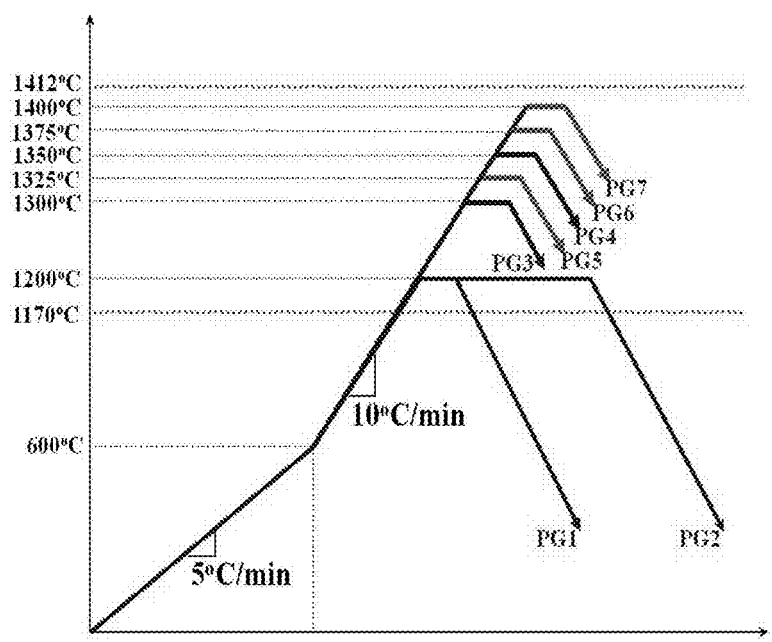
FIG. 1 is a graph schematically showing the pre-sintering conditions according to an embodiment of the present invention.

Hereinafter, the present invention will be described in detail with reference to the accompanying drawings.

A. Granulation of Silicon (Si) and Sintering Additive

In the present invention, granules were prepared by a spray-drying method. Granules include silicon and a sintering additive for accelerating the nitridation reaction of silicon and accelerating sintering. As the sintering additive, a ternary low-melting sintering additive including yttria, alumina and an alkali earth metal oxide, such as MgO, CaO, SrO, BaO or the like, is used. Meanwhile, a general raw material containing silicon (Si) is formed on the surface thereof with a silicon dioxide ($SiO_2$) film, and this silicon dioxide ($SiO_2$) film can assist the sintering of the raw material during a subsequent sintering process together with a sintering additive.

In the present invention, it is preferred that the amount of the sintering additive be 2~5 wt % based on the amount of $Si_3N_4$ calculated by assuming that the silicon has completely nitrided.

In the present invention, granules were prepared by atomizing powder mixtures of silicon (Si) and YAC-based sintering additives ($Y_2O_3$—$Al_2O_3$—CaO, $T_{eu}$=1170° C.) using an atomizer at a rotation speed of 10000 rpm. In this case, the amounts of the YAC-based sintering additives were 3 wt %, 4.5 wt % and 6 wt % with respect to YAC3, YAC4.5 and YAC6, assuming that silicon, as a starting material, is 100% nitrided into silicon nitride ($Si_3N_4$)

TABLE 1

| | Si | $Y_2O_3$ | $Al_2O_3$ | $CaCO_3$ | PAA | PVA | unit: g Water |
|---|---|---|---|---|---|---|---|
| YAC3 | 100 | 2.67 | 1.33 | 2.05 | 0.53 | 2.12 | 108.7 |
| YAC4.5 | 100 | 4.06 | 2.03 | 3.13 | 0.55 | 2.18 | 112.0 |
| YAC6 | 100 | 5.50 | 2.75 | 4.24 | 0.56 | 2.25 | 115.3 |

Slurry for atomizing was prepared by planetary milling. Here, the ratio of solid to water was 1:1, the amount of the sintering additive was 3 wt % based on the amount of $Si_3N_4$ calculated by assuming that silicon was completely nitrided, the amount of a dispersant was 0.1~0.8 wt % based on the solid (Si+sintering additive), and the amount of a binder was 2.0~6.0 wt % based on the solid (Si+sintering additive). During the spray-drying, the rotation speed of a stirrer was maintained at 100 rpm, and the temperatures of the inlet and outlet of the spray drying chamber were maintained at 150~300° C. and 80~120° C., respectively.

Subsequently, the spray-dried granules were sieved such that they have a predetermined particle size. In the following specification, m38.5 is referred to as a sample sieved to have a particle size of 32~45 μm, m38.5 is referred to as a sample sieved to have a particle size of 32~45 μm, m54 is referred to as a sample sieved to have a particle size of 45~63 μm, m76.5 is referred to as a sample sieved to have a particle size of 63~90 μm, and m107.5 is referred to as a sample sieved to have a particle size of 90~125 μm. As-SD granules are referred to as all sizes of spray-dried granules which were not sieved.

B. Preparation of Pre-Sintered Granules

Since the eutectic temperature of a YAC-based sintering additive is 1170° C., the difference between the eutectic temperature of the YAC-based sintering additive and the melting point (1412° C.) of silicon (Si) is sufficient. Therefore, when heat treatment is conducted under an argon (Ar) atmosphere at the eutectic temperature or higher, nitridation is excluded, so that the sintering between granules is slight, and liquid-phase sintering is conducted inside granules by a sintering additive. In the present invention, in order to examine the effects of pre-sintering temperature influencing the formation of granules, heat treatment was conducted at 1200° C., 1300° C. and 1350° C., each of which is higher than the eutectic temperature of the YAC-sintering additive and is lower than the melting point of silicon, for 10 minutes using a tube furnace of an argon atmosphere. Samples under the respective temperature conditions are indicated by PG1, PG3 and PG4. Meanwhile, a sample was heat-treated at a temperature of 1200° C. for 60 min, and this sample is indicated by PG2. As described later, since pre-sintered granules prepared using PG4 (1350° C.~10 min) have excellent properties in terms of microstructure, strength and air permeability, in order to obtain optimal pre-sintering conditions, experiments were performed at 25° C. intervals in the temperature range of 1300° C. to 1400° C., and the samples used in the respective experiments are indicated by PG5 (1325° C.-10 min), PG6 (1375° C.-10 min) and PG7 (1400° C.-10 min), respectively. FIG. 1 is a graph schematically showing pre-sintering conditions according to an embodiment of the present invention.

C. Behavior of Pre-Sintered Granules Depending on the Amount of Sintering Additive The strength and flowability of pre-sintered granules depending on the content of a sintering additive were measured.

Figure 2:
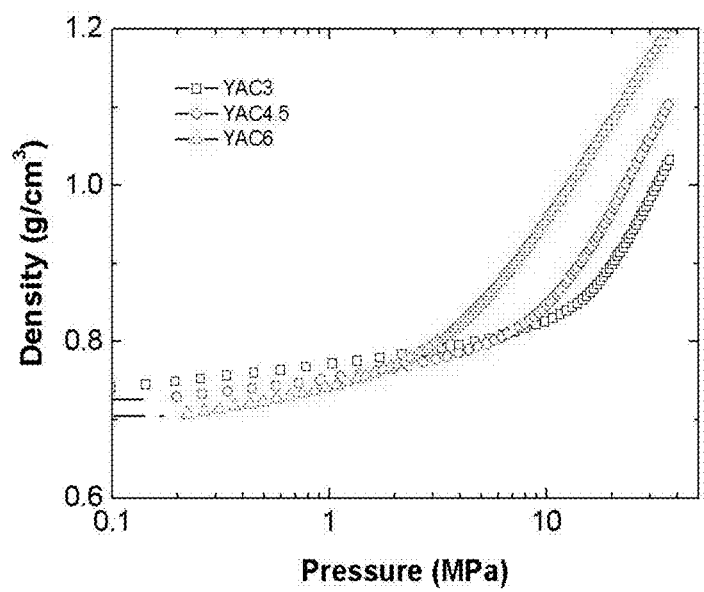
FIG. 2 is a graph showing the strength of the pre-sintered granule, measured by changing the amount of a sintering additive, according to an embodiment of the present invention.

Granules were charged in a cylindrical mold having a diameter of 10 mm under the influence of gravity, and then the 'load-displacement' relationship was measured under the compression experimental conditions at a constant displacement rate (0.5 mm/min). Subsequently, the 'molding density-molding pressure' relationship was calculated by substituting the mass of experimentally-used granules for the measured 'load-displacement' relationship, and then the strength of pre-sintered granules was inferred from the inflection point of the curve shown in the 'molding density-molding pressure' relationship.

m107.5 granules are pre-sintered under the condition of PG4 (1350° C.-10 min) with respect to YAC3, YAC4.5 and YAC6, and then the strength of the pre-sintered granules were measured. As shown in FIG. 2, the granule strength thereof was increased in order of YAC6<YAC4.5<YAC3, and the tapping density (intercept of density axis) thereof in the non-pressurized state was also increased in the order of YAC6<YAC4.5<YAC3. When the amount of a sintering additive is increased, the size of silicon aggregates formed in granules by liquid-phase sintering is increased, and simultaneously the size of the gap between the silicon aggregates is greatly increased. In this case, it is inferred that the gap acts as a source for destroying granules at the time of the compression experiment of pre-sintered granules, thus causing such a phenomenon.

The flowability of granules before and after pre-sintering was evaluated based on the JIS standard 'Z 2502-1979'. Specifically, the flowability thereof was evaluated by drying about 5 g of a granule sample at 105° C. for 1 hour to remove moisture, cooling the dried granule sample to room temperature in a desiccator and then measuring the time it takes to allow the granule sample to pass through an orifice having a diameter of 2.54 mm.

Figure 3:
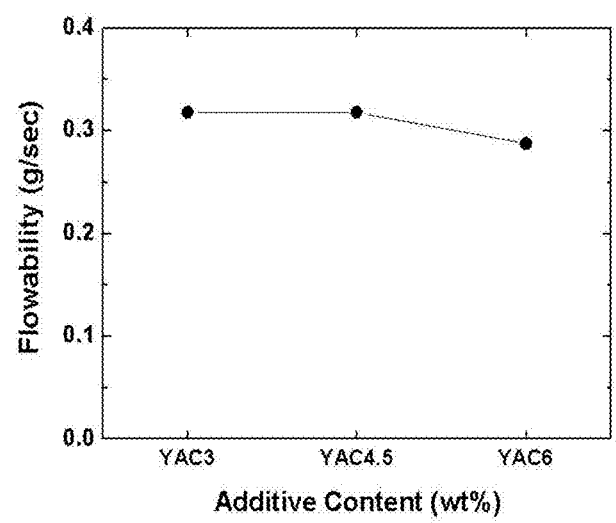
FIG. 3 is a graph showing the flowability of granular powder prepared by changing the amount of a sintering additive, according to an embodiment of the present invention.

As shown in FIG. 3, the flowability of granules was decreased as the amount of a sintering additive was increased, and the flowability thereof, similarly to the strength thereof, was increased in order of YAC6<YAC4.5<YAC3. When the amount of a sintering additive was increased, the strength of granules was decreased because granules were rapidly aggregated by liquid-phase sintering. For this reason, it is inferred that the flowability of granules was decreased because the surface roughness thereof was increased.

Therefore, it is preferred that the amount of a sintering additive be less than 6 wt % in terms of the strength and flowability of pre-sintered granules. Particularly, when the amount of a sintering additive is less than 2 wt %, it is difficult to obtain silicon nitride particles having an intrinsic needle-shaped microstructure when nitridation and sintering were completed, so it more preferred that the amount of the sintering additive be 2~5 wt %.

D. Behavior of Granules Depending on Pre-Sintering Conditions

From the above experiments, the influence of pre-sintering conditions on a YAC3 composition exhibiting most excellent characteristics in terms of the strength and flowability of granules was examined. Consequently, even when the amount of a sintering additive was changed within the range of 2~5 wt %, the eutectic temperature of YAC-based compositions was not changed, so that the pre-sintering conditions of YAC-based compositions may be represented by those of the YAC3 composition.

Figure 4:
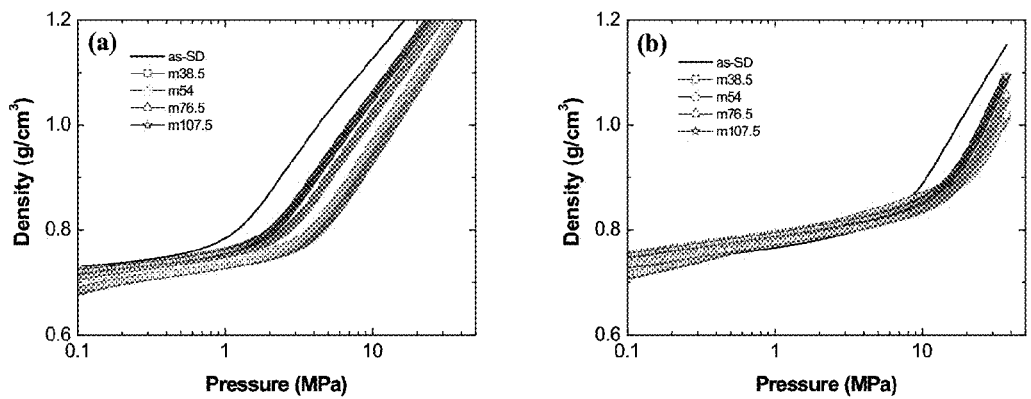
FIG. 4 shows graphs showing the results of the compression experiment of a pre-sintered granule, measured by changing the size thereof, according to an embodiment of the present invention.

FIG. 4 shows graphs showing the results of the compression experiment of PG1 granules and PG4 granules of a YAC3 composition. In FIG. 4, the pressure at an inflection point means yield strength at which granules start to be deformed and/or destroyed, and thus this inflection point becomes a starting point for a rapid increase in density. In the case of PG1 (1200° C. 10 min) granules having the lowest pre-sintering temperature, the strength of pre-sintered granules depends on the size of granules. That is, the strength of pre-sintered granules was increased as the size of granules decreased, and the maximum strength thereof was about 5 MPa with respect to m38.5 granules (refer to FIG. 4 (*a*)). In contrast, in the case of PG4 (1350° C. 10 min) granules, the strength of pre-sintered granules slightly depends on the size of granules. That is, the strength thereof was measured about 20 MPa over all kinds of granules excluding as-SD granules (refer to FIG. 4 (*b*)). Meanwhile, the tapping density of granules, obtained by the self weight thereof without applying molding pressure, is indicated by the intercept of the axis of molding density in the graph. Comparing the tapping density of PG1 granules with that of PG4 granules, it was ascertained that the tapping density of PG4 granules is a little higher than that of PG1 granules. It is determined that the reason for this is because the density of PG4 granules pre-sintered at higher temperature is higher than that of pre-sintered PG1 granules.

Figure 5:
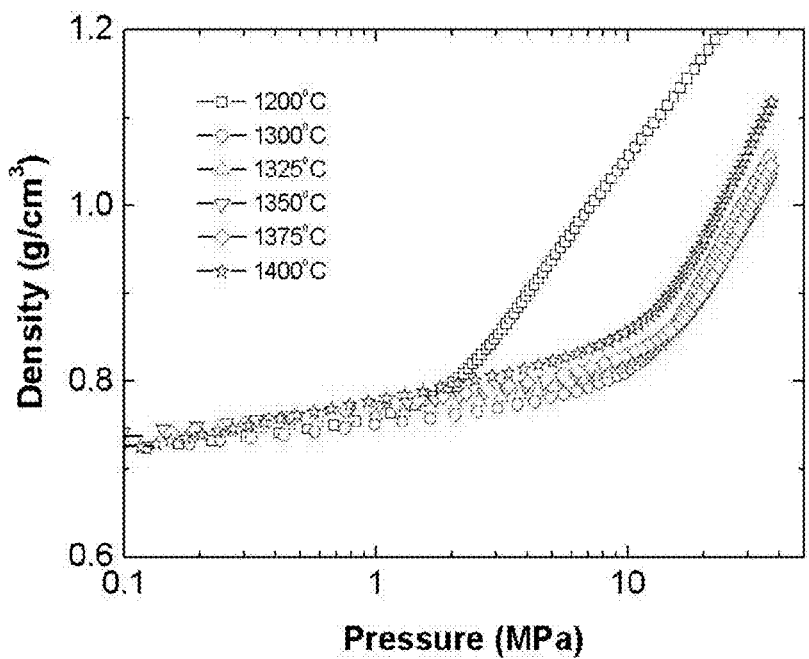
FIG. 5 is a graph showing the results of the compression experiment of a pre-sintered granule, measured by changing the temperature, according to an embodiment of the present invention.

FIG. 5 is a graph showing the results of measuring the strength of pre-sintered m107.5 granules of a YAC3 composition depending on temperature by the compression experiment. The strength of PG1 granules heat-treated at 1200° C. was 2~3 MPa, which is lowest, and the strengths of other kinds of granules heat-treated at 1300° C. or more was about 20 MPa, the strengths thereof being similar to each other. That is, it was ascertained that the strength of granules did not depend on temperature in the pre-sintering temperature range of 1300~1400° C.

Figure 6:
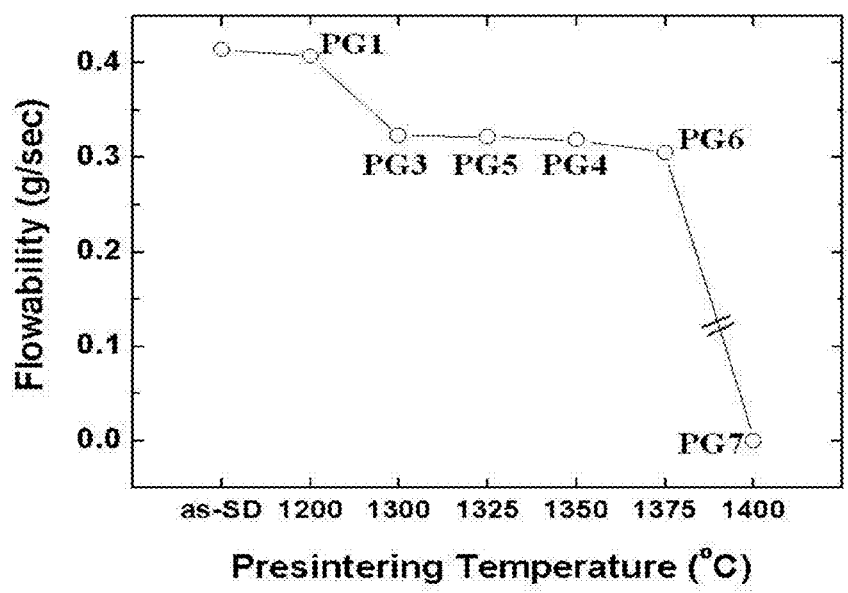
FIG. 6 is a graph showing the flowability of a pre-sintered granule, measured by changing the temperature, according to an embodiment of the present invention.

FIG. 6 is a graph showing the results of measuring the flowability of m107.5 granules of a YAC3 composition depending on pre-sintering temperature. From FIG. 6, it was ascertained that the flowability of PG1 granules was similar to that of raw granules (as-SD) which were not pre-sintered, and that the flowability of PG3, PG4, PG5 and PG6 granules, each of which was pre-sintered at 1300~1375° C., was somewhat decreased. Therefore, samples pre-sintered at 1300~1375° C. exhibit low flowability compared to that of a sample pre-sintered at 12000, but it is determined that they are not problematic to handle. Meanwhile, in the case of PG7 granules pre-sintered at 1400° C., after a small amount of the PG7 granules had passed through an orifice, the orifice was clogged by them, so it was impossible to measure the flowability thereof. It is determined that the reason why the flowability of granules pre-sintered at 1375° C. or less is decreased is because the surface roughness of granules is increased by liquid-phase sintering in the granules, and the reason why the flowability of granules pre-sintered at 1400° C. is decreased is because a part of granules is sintered as well as the surface roughness thereof being increased.

Therefore, it can be ascertained that the optimum pre-sintering temperature be 1300~1375° C. in terms of granule strength and granule flowability.

E. Behavior of Pre-Sintered Granules Depending on Nitridation

A YAC3 composition having excellent granule strength was formed by uniaxial pressing (3.7 MPa), and then nitridation was conduced at 1400° C. for 4 hours.

Figure 7:
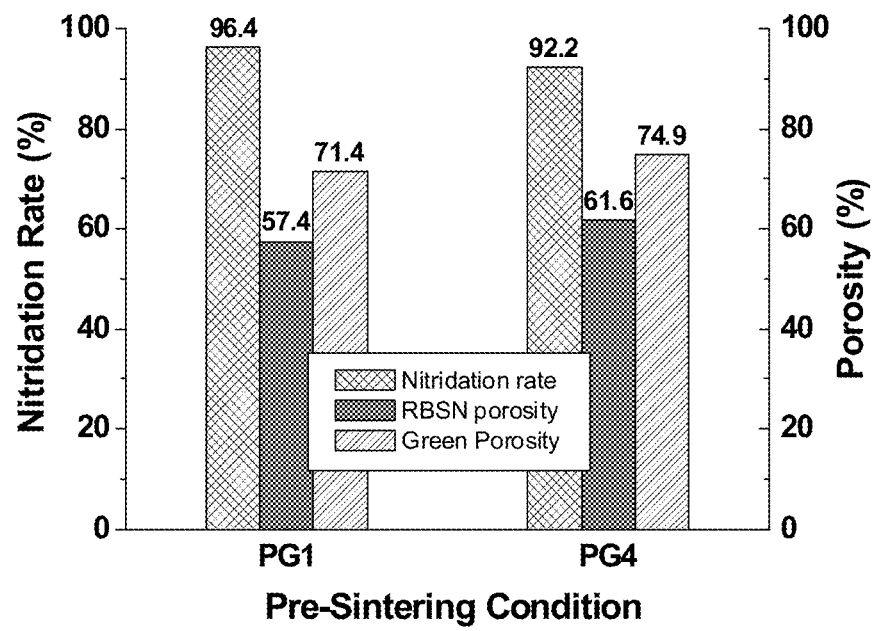
FIG. 7 is a graph showing the nitridation reaction behavior of a pre-sintered granule according to an embodiment of the present invention.

As shown in FIG. 7, in the same nitridation condition, the nitridation rate of a PG1 compact was 96.4%, and the nitridation rate of a PG4 compact was 92.2%, so that the nitridation rate of PG4 was a little lower than that of PG1. However, 90% or more of nitration rates, necessary for sintering, was obtained. Further, as the result of XRD analysis, it was ascertained that residual silicon did not exist in either of the two samples.

Meanwhile, the porosity of reaction-bonded silicon nitride (RBSN) in PG1 depending on nitridation was 57.4%, and the porosity of reaction-bonded silicon nitride (RBSN) in PG4 was 61.6%, so that the porosity of RBSN in PG4 was higher than that of RBSN in PG1. The reason for this can be thought of as follows. First, PG4 granules have high granule strength, so the granule stability thereof is excellent at the time of uniaxial pressing, thereby increasing the porosity of a PG4 compact itself. Next, it can be understood that the nitridation rate of PG4 was lower than that of PG1, so the porosity of SRBSN in PG4 was higher than that of SRBSN in PG1.

F. Sintering of Pre-Sintered Granules and Evaluation of Characteristics of Porous SRBSN In order to improve the formability of pre-sintered granules, a small amount of 5% PVA solution was added to pre-sintered granules and then uniaxially pressed at a pressure of 3.7 MPa to obtain a sample. Subsequently, the sample was dried at 105° C. for 24 hours to remove moisture. The dried sample was nitrided at 1350~1450° C. for 2~10 hours, and was then sintered at 1700~1900° C. for 1~4 hours to prepare porous sintered reaction-bonded silicon nitride (SRBSN). The characteristics of the prepared porous SRBSN were evaluated.

(a) Characteristics of Porous SRBSN Depending on Sintering Temperature

Figure 8:
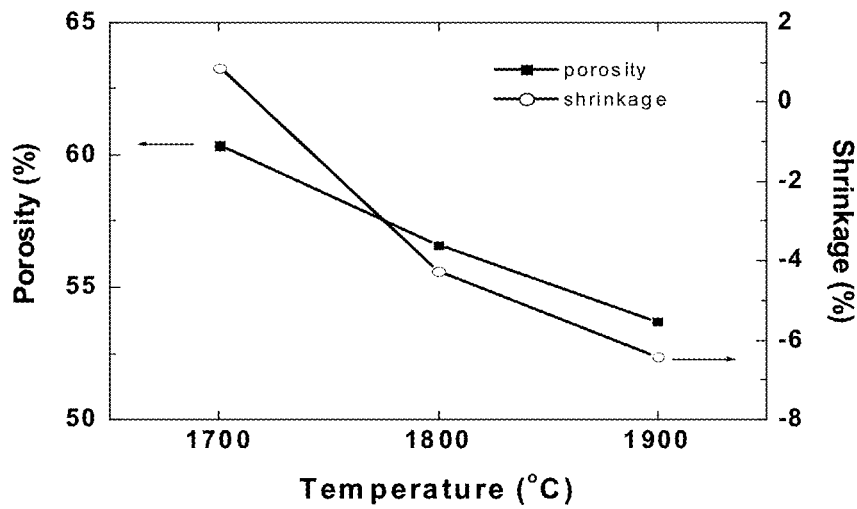
FIG. 8 is a graph showing the porosity and shrinkage of a sintered reaction-bonded silicon nitride depending on the sintering temperature according to an embodiment of the present invention.

FIG. 8 is a graph showing the porosity and shrinkage of SRBSN prepared using m76.5-PG4 (granule size-pre-sintering condition) granules depending on sintering temperature. From FIG. 8, it was ascertained that, when sintering temperature was increased, the shrinkage of SRBSN increased, thus decreasing the porosity of SRBSN. When the sintering temperature was 1700° C., the shrinkage of SRBSN was approximately 0%, and thus the porosity of SRBSN was similar to that of RBSN. Further, even when the sintering temperature was 1900° C., the shrinkage of SRBSN was approximately 6%, and thus SRBSN having a porosity of 50% or more could be obtained. Therefore, it can be seen that the finally sintered granules have a spherical shape such that they can be maintained at a spray-dry state.

Figure 9:
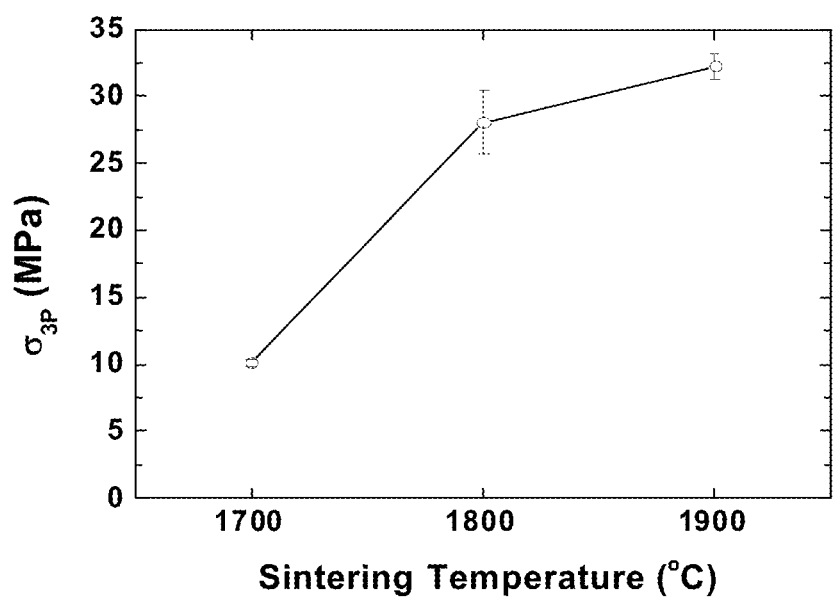
FIG. 9 is a graph showing the three-point bending strength of the sintered sample of FIG. 8, measured depending on the sintering temperature.

FIG. 9 is a graph showing the three-point bending strength of SRBSN.

For the purpose of three-point bending strength measurement, four quadrangular samples, each having a size of 20 mm (span length)×2 mm (height)×1.5 mm (width), were tested depending on sintering temperature. As shown in FIG. 9, the bending strength thereof was increased as sintering temperature was increased. It is determined that the increase in the bending strength thereof depending on the increase in the sintering temperature is connected with the decrease in porosity attributable to the increase in shrinkage.

The shrinkage of granules includes the shrinkage in granules and the shrinkage between granules. Since the liquid sintering additive is generally distributed in the granules, it is inferred that the former greatly contributes to the shrinkage of granules compared to the latter.

Figure 10:
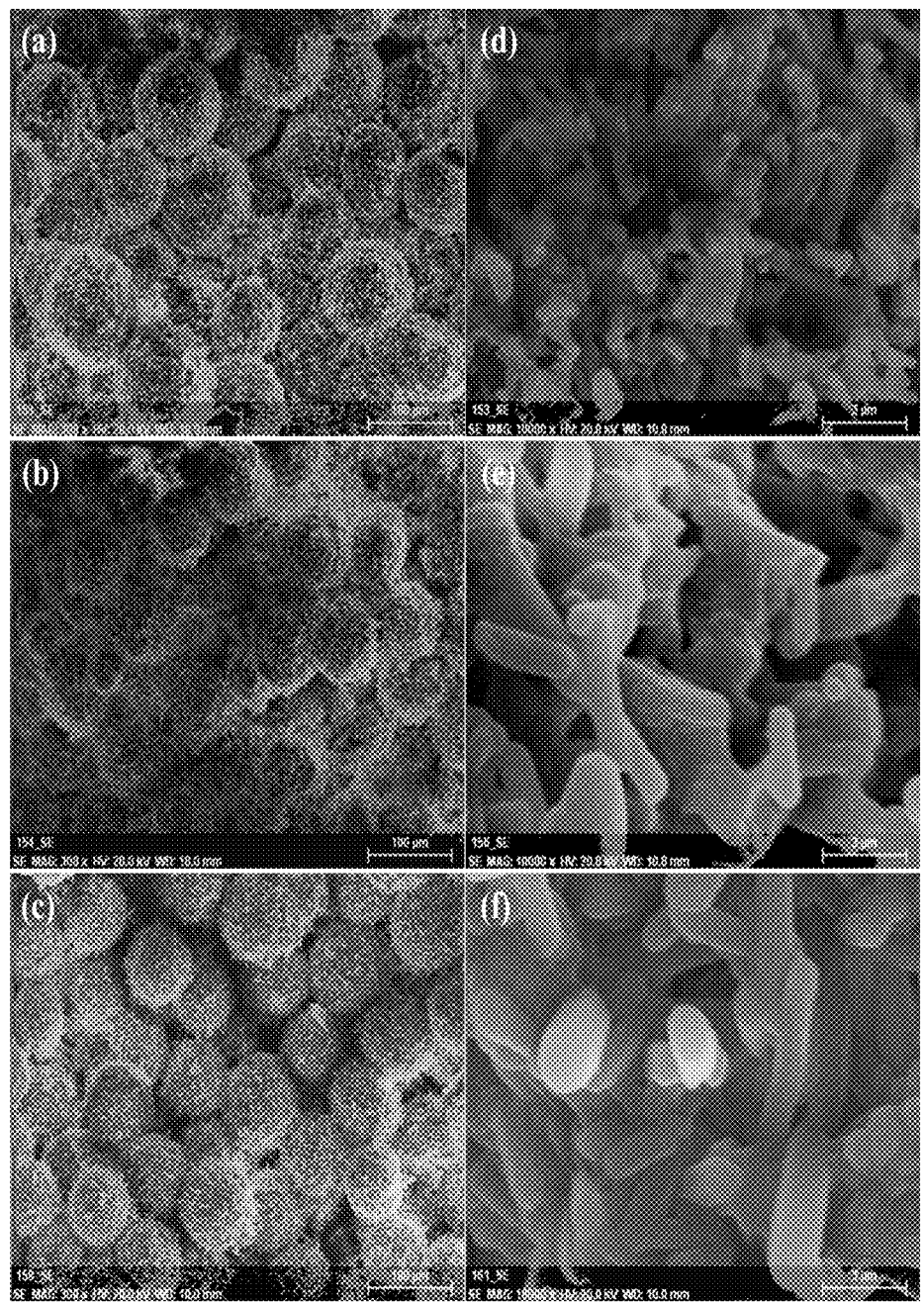
FIG. 10 shows photographs showing the microstructure of the sintered sample of FIG. 8, observed by an electron microscope.

However, as shown in FIG. 10, observing the shape of the section of the SRBSN sample, it can be seen that the destruction in granules is barely observed, and the destruction between granules is predominantly observed. The reason for this is determined that the interconnection between needle-shaped particles grown on the surface of granules becomes strong depending on the increase in sintering temperature, thus increasing the strength of the SRBSN sample.

The bending strength of the sample at a sintering temperature of 1900° C. is 32.3±1.0 MPa, which is similar to that of a commercially-available SiC hot gas filter. However, considering that the porosity of the commercially-available SiC hot gas filter is about 40%, it can be seen that the strength of the SRBSN sample is high.

FIG. 10 shows photographs of the microstructures of the sections of SRBSN samples of FIG. 8 observed by an electron microscope, wherein (a) to (c) are the low-magnification photographs of the microstructures from the specimen sintered at 1700° C., 1800° C. and 1900° C., respectively, and (d) to (f) are the high-magnification photographs of the microstructures from the specimen sintered at 1700° C., 1800° C. and 1900° C., respectively. As shown in (a) to (c) of FIG. 10, it can be seen that all granules maintain spherical shapes regardless of uniaxially pressing, and thus macropores are formed between granules. Meanwhile, white particles existing on the surface of granules are needle-shaped silicon nitride particles. Since these needle-shaped silicon nitride particles serve to increase the specific surface area of pores by decorating macropores, they are expected to contribute to the improvement of the capacity for collecting nanoparticles. As shown in (d) to (f) of FIG. 10, it can be seen that silicon nitride particles are grown with the increase of sintering temperature, and that needle-shaped particles existing on the surface of granules were entangled with each other between granules. Therefore, it is inferred that the growth of particles attributable to the increase of sintering temperature can be directly connected with the increase in strength of a porous material.

Figure 11:
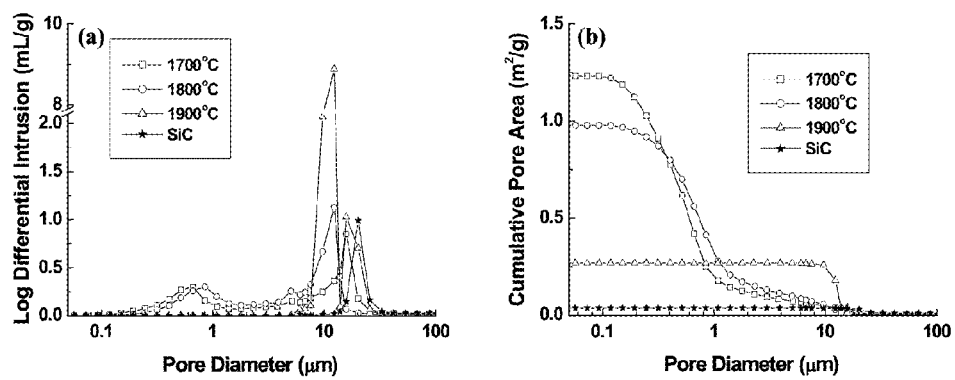
FIG. 11 shows graphs showing the results of analysis of porosity of the sintered sample of FIG. 8 which is measured by a mercury penetration technique.

FIG. 11 shows graphs showing the results of analysis of porosity of the SRBSN sample of FIG. 8 which is measured by a mercury penetration technique, wherein (a) shows the pore size and (b) shows specific surface area. A porous SiC material, used as a reference sample, exhibits a porosity of 39%.

As shown in FIG. 11, in the case of micropores having a pore diameter of 1 µm or less, the pore diameter thereof increases as the sintering temperature increases (1700° C.→1800° C.). However, in the case of the SRBSN sample at a sintering temperature of 1900° C., micropores were not observed, and macropores having a pore diameter of about 10 µm were somewhat decreased. Further, in the case of the SRBSN sample at a sintering temperature of 1900° C., the volume of macropores was rapidly increased.

The specific surface area of pores decreased depending on the increase in sintering temperature because micropores are grown in granules by liquid-phase sintering (refer to FIG. 11 (a)). Particularly, in the case of the SRBSN sample at a sintering temperature of 1900° C., the specific surface area of pores thereof was rapidly decreased compared to that of pores of each of the SRBSN samples at a sintering temperature of 1700° C. and 1800° C. because it had only macropores due to the fact that peaks of pore size corresponding to micropores disappeared.

As analyzed above, the reason why the SRBSN sample at a sintering temperature of 1900° C. does not have micropores is inferred to be because the shrinkage in granules is excessive, and thus the micropore channel existing on the surface of granules is clogged. For reference, a porous SiC material, as a comparative example, has only macropores without micropores. A porous SRBSN material of the present invention has a specific surface area of 1.0 m²/g, whereas the porous SiC material has a low specific surface area of 0.04 m²/g.

Figure 12:
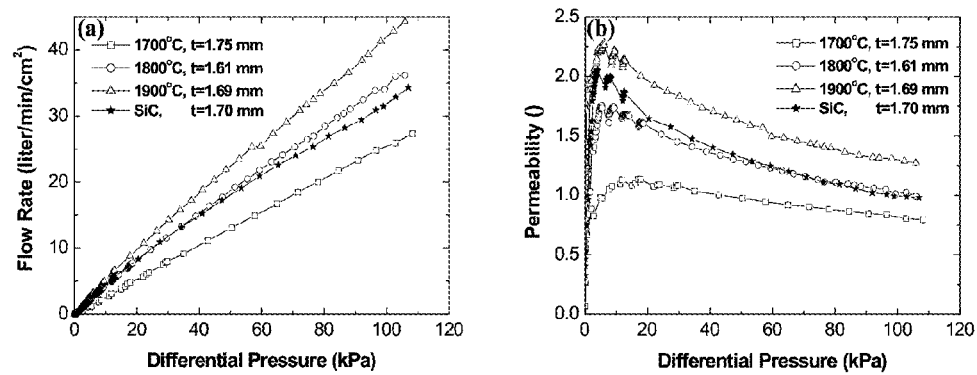
FIG. 12 shows graphs showing the results of measurement of air permeability of the sintered reaction-bonded silicon nitride (SRBSN) sample of FIG. 8.

FIG. 12 shows graphs showing the results of measurement of air permeability of SRBSN samples of FIG. 8. The air permeability thereof was measured using a CFP-1200-AEL manufactured by Porous Material Inc.

As shown in FIG. 12, the porosity of SRBSN sample decreased, but the flow rate thereof increased depending on the increase in sintering temperature (refer to FIG. 12 (a)). The reason for this is inferred to be because the flow rate thereof is influenced by the diameter and volume fraction of macropores as well as the porosity thereof. It can be seen that a porous SiC material has a flow rate similar to that of the SRBSN sample of the present invention. The reason for this is inferred to be due to the fact that the porous SiC material has macropores although it has low porosity.

The air permeability of the SRBSN sample tends to be similar to the flow rate thereof (refer to FIG. 12 (b)). Consequently, it can be seen that the air permeability of the SRBSN sample at a temperature of 1800° C. is similar to that of the porous SiC material, and that the air permeability of the SRBSN sample at a temperature of 1900° C. is higher than that of the porous SiC material.

(b) Characteristics of Porous Materials Depending on Sintering Time

Figure 13:
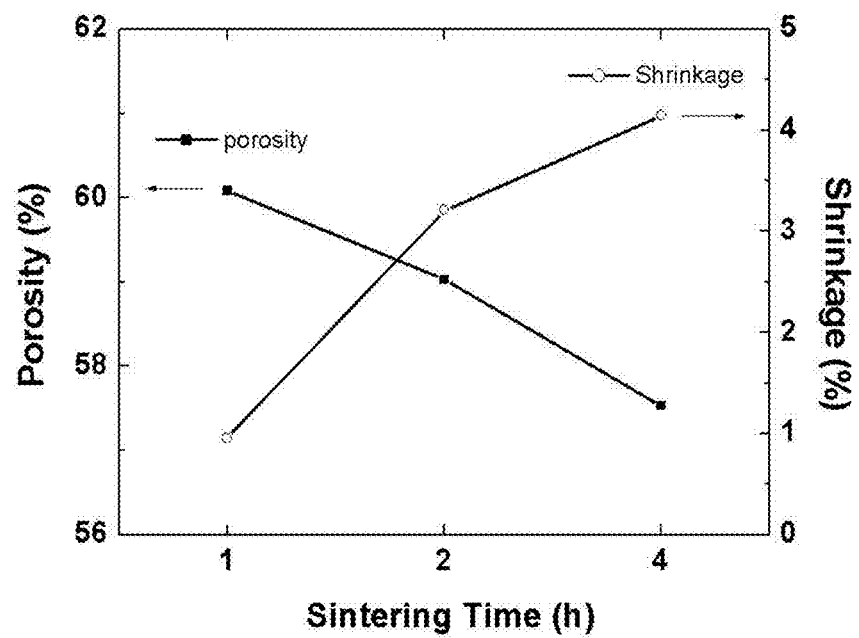
FIG. 13 is a graph showing the porosity and shrinkage of the sintered sample, measured by changing the sintering time, according to an embodiment of the present invention.

FIG. 13 is a graph showing the porosity and shrinkage of the m76.5-PG4 SRBSN sintered at 1800° C. depending on sintering time. When the sintering time was 1 hour, 2 hours or 4 hours, the shrinkage thereof was 1%, 3% or 4%, and the porosity thereof was 60%, 59% or 58%. From these results, it can be seen that it is possible to manufacture a near-net shape sintered material.

Figure 14:
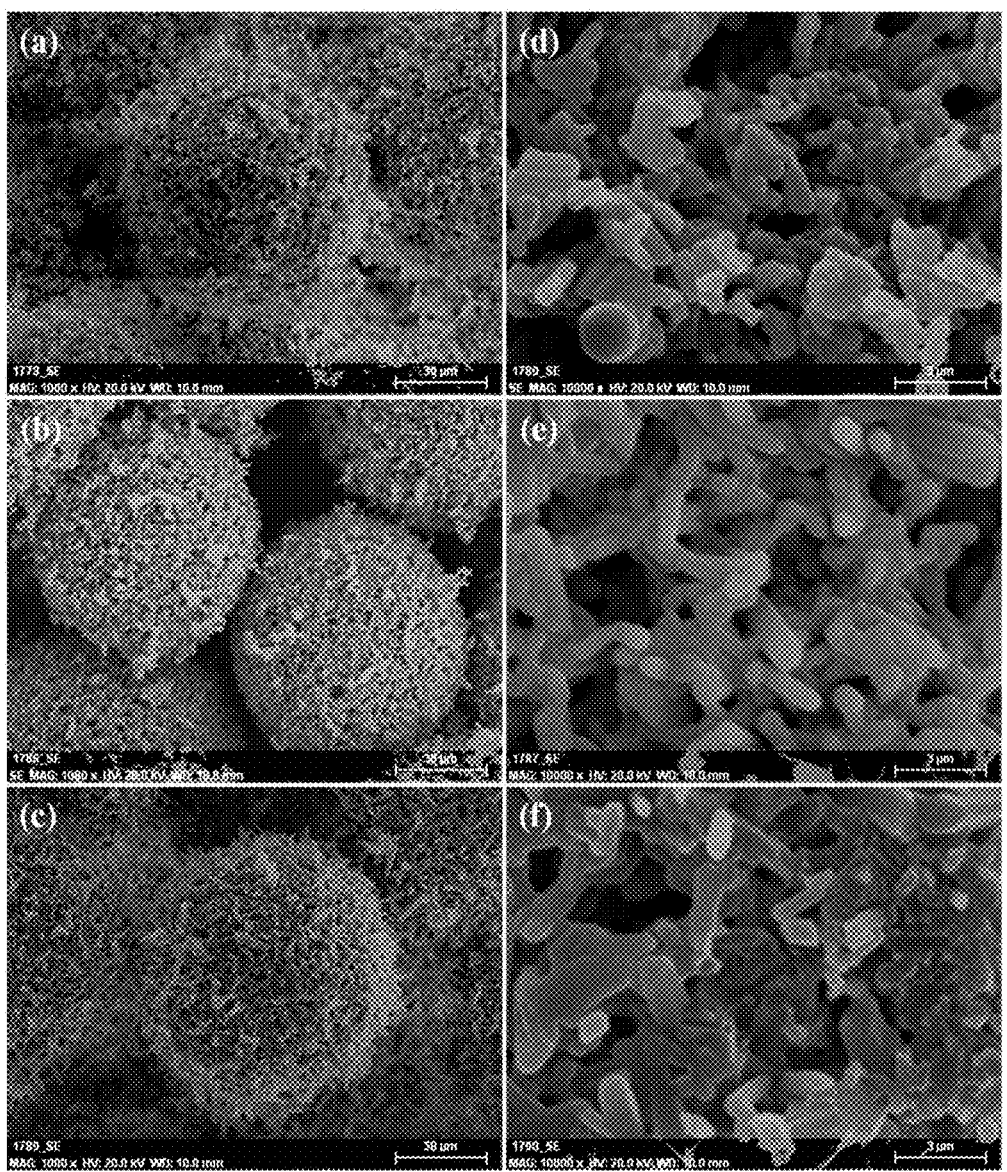
FIG. 14 shows photographs showing the microstructure of the test sample of FIG. 13, observed with an electron microscope.

FIG. 14 shows photographs of the microstructures of the sections of SRBSN samples of FIG. 13, observed by an electron microscope. As shown in (a) to (c) of FIG. 10 as photographs observed in low magnification, it can be seen that all granules maintain spherical shapes regardless of uniaxially pressing, and thus macropores are formed between granules. As shown in (d) to (f) of FIG. 14 as photographs observed in high magnification, it can be seen that particle growth is somewhat observable with the increase in sintering time, but the influence thereof is slight compared to the dependency of sintering temperature in FIG. 10.

Figure 15:
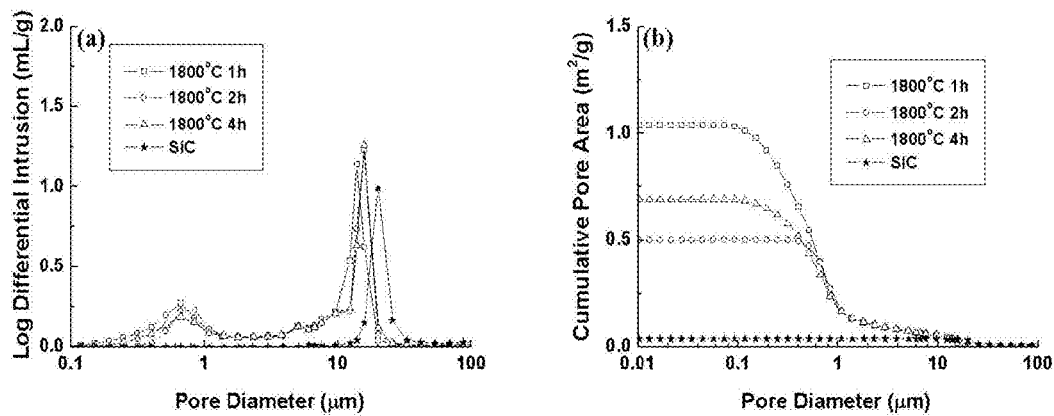
FIG. 15 shows graphs showing the results of analysis of porosity of the sample of FIG. 13 which is measured by a mercury penetration technique.

FIG. 15 shows graphs showing the results of analysis of porosity of the SRBSN sample of FIG. 13, which is measured by a mercury penetration technique, depending on sintering time. The size of micropores having pore diameter of 1 µm or less was slightly changed with the increase in sintering time, whereas the size of macropores having a pore diameter of about 10 µm somewhat increased (refer to FIG. 15 (a)). Meanwhile, the volume fraction of micropores increased in order of 2 hours<4 hours<1 hour as shown in FIG. 15 (a), and thus it was observed that the specific surface area thereof was also increased in order of 2 hours<4 hours<1 hour (refer to FIG. 15 (b)).

Figure 16:
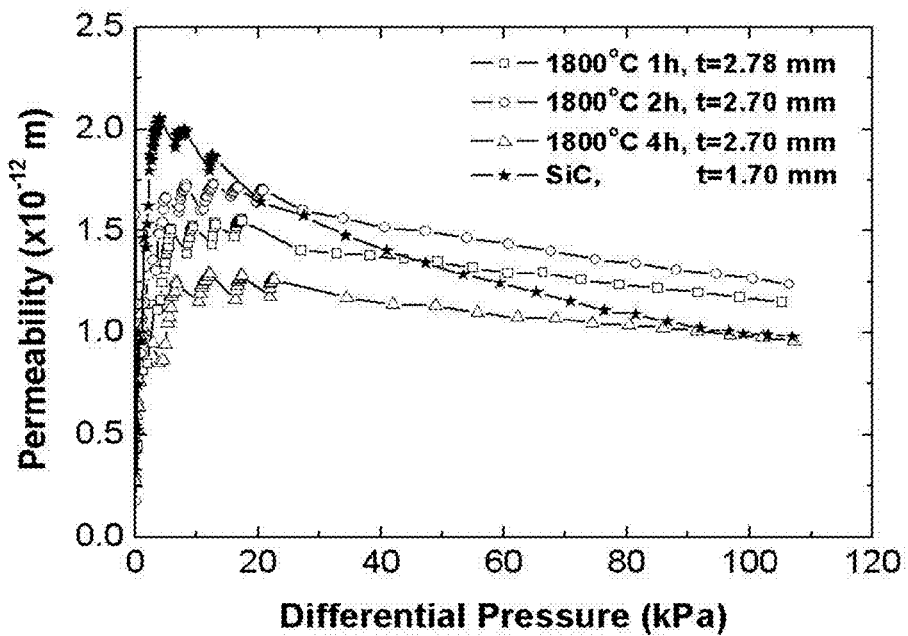
FIG. 16 is a graph showing the results of measurement of air permeability of the SRBSN sample of FIG. 13 and a silicon carbide (SiC) sample.

FIG. 16 shows graphs showing the results of measurement of air permeability of SRBSN samples of FIG. 13 and a porous SiC material as a reference sample. The air permeability thereof greatly depends on the size and porosity of macropores. In this experiment, it was observed that the air permeability thereof was most excellent at a sintering time of 2 hours. That is, the size of macropores increased in the order of 1 hour<2 hour=4 hours, and the porosity thereof increased in the order of 4 hours<2 hours<1 hour. Therefore, it can be seen that the air permeability thereof can be optimized at a sintering time of 2 hours.

(c) Characteristics of Porous Materials Depending on Granule Size

Figure 17:
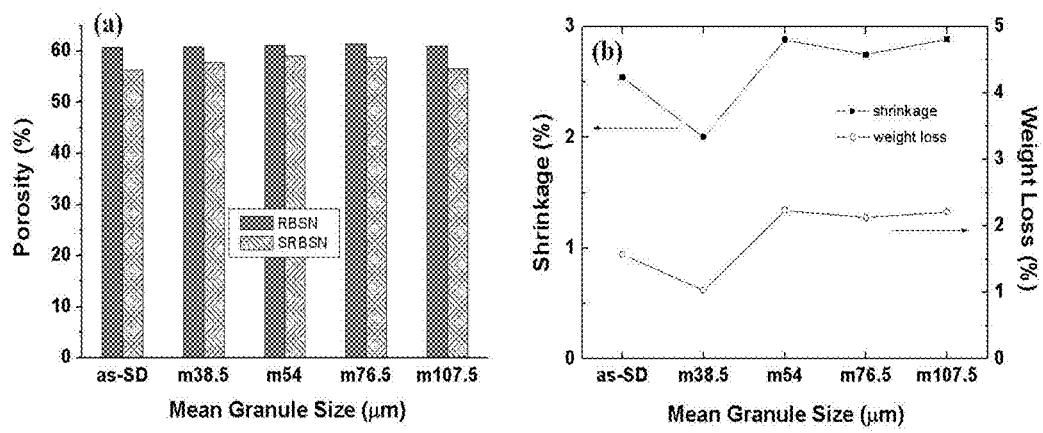
FIG. 17 shows graphs showing the porosity, shrinkage and weight loss of SRBSN depending on granule size according to an embodiment of the present invention.

FIG. 17 shows graphs showing the porosity, shrinkage and weight loss of SRBSN and RBSN depending on granule size under the condition of PG4-1800° C.-2 h (presintering condition-sintering temperature-sintering time). As shown in FIG. 17, the porosities of RBSN and SRBSN are 60% and 55%, respectively, which are constant without relation to granule size. The shrinkage and weight loss thereof were 3% and 2%, which slightly depends on granule size. That is, when the composition of granules is identical, the sintering behavior of granules does not depend on granule size.

Figure 18:
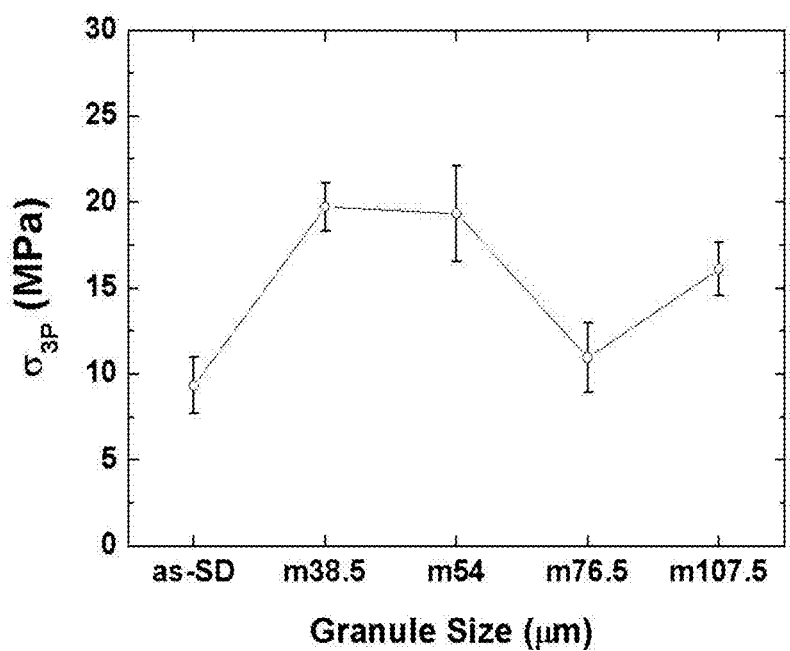
FIG. 18 is a graph showing the three-point bending strength of the SRBSN of FIG. 17.

FIG. 18 is a graph showing the three-point bending strength of SRBSN of FIG. 17. Although the relationship between granule size and bending strength is not clear, porous materials (m38.5, m54) having small granules have higher bending strength than that of porous materials (as-SD, m76.5, m107.5) having large granules. It is predicted that the size of macropores between granules increased with the increase in granule size, thus decreasing rupture strength.

Figure 19:
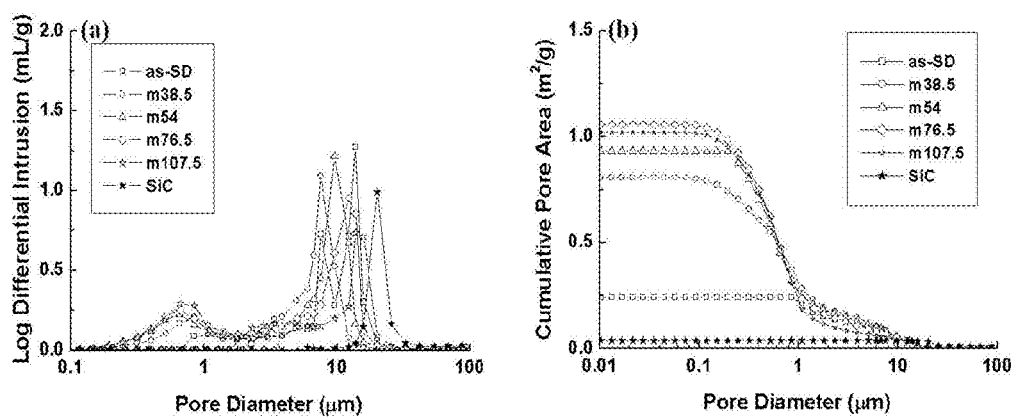
FIG. 19 shows graphs showing the results of analysis of porosity of the SRBSN of FIG. 17 which is measured by a mercury penetration technique.

FIG. 19 shows graphs showing the results of the analysis of porosity of SRBSN of FIG. 17 which is measured by a mercury penetration technique. Referring to FIG. 19 (a), micropores having a pore size of 1 µm or less, excluding as-SD, are uniformly distributed without relation to granule size, but macropores having a pore size of about 10 µm become nonuniform with the increase in granule size. The specific surface area of pores is controlled by micropores. As shown in FIG. 19 (b), since the volume fraction of micropores of an as-SD sample is lowest and the volume fraction of micropores of m76.5 and m107.5 samples is highest, it is observed that the specific surface area thereof is also identical with the volume fraction thereof. The as-SD sample includes a large number of microgranules. The specific surface area of a porous material having microgranules is low when measured because it is easy to isolate micropores in mircogranules.

Figure 20:
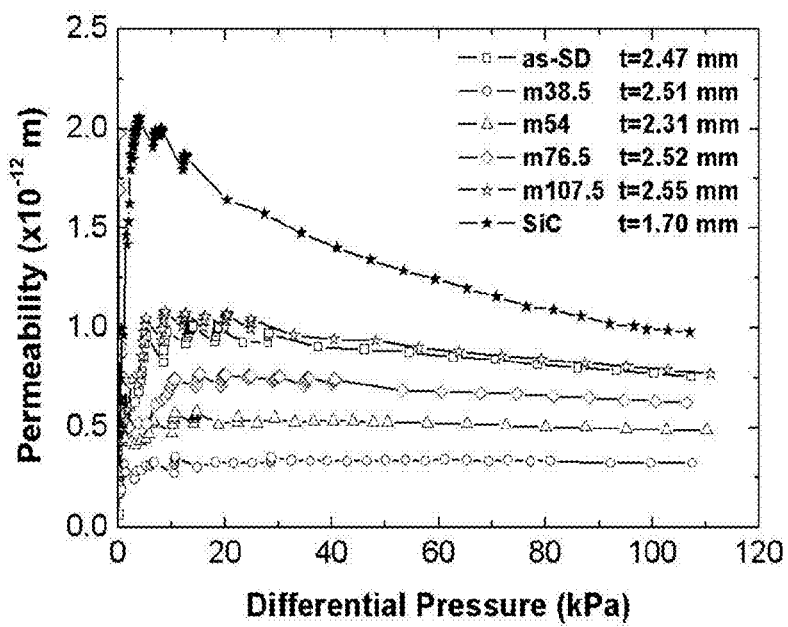
FIG. 20 is a graph showing the results of measurement of air permeability of the SRBSN of FIG. 17.

FIG. 20 shows a graph showing the results of measurement of air permeability of SRBSN samples of FIG. 17. As shown in FIG. 20, it can be seen that the air permeability thereof is increased in the order of m38.5<m54<m76.5<as-SD<m107.5. The air permeability thereof is controlled by the size and porosity of macropores. In this case, the porosity of macropores is similar without relation to granule size, but the size of macropores increases in proportion to granule size. Therefore, it can be seen that the air permeability thereof is improved in proportion to granule size.

Figure 21:
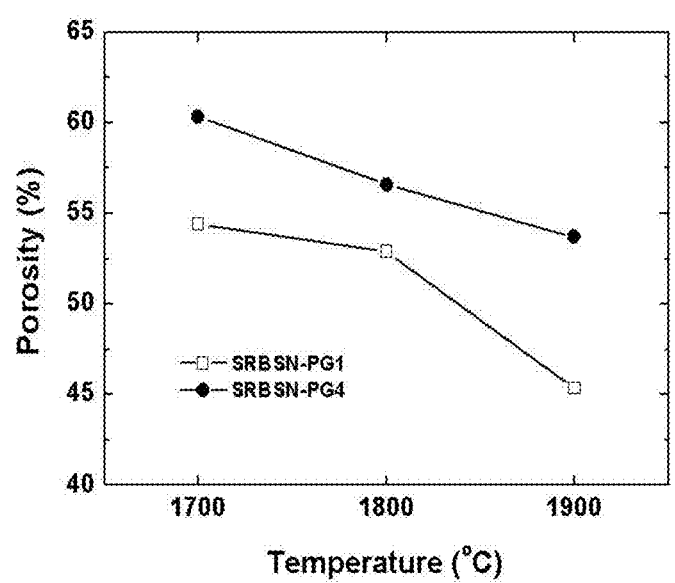
FIG. 21 is a graph showing the porosity of the sintered reaction-bonded silicon nitride prepared by granules with different pre-sintering conditions in relation to the sintering temperature.

(d) Comparison of Characteristics of Porous Materials Depending on Sintering Temperature FIG. 21 is a graph showing the results of measurement of porosity of SRBSN samples of YAC3-m76.5-PG1 and YAC3-m76.5-PG4 depending on sintering temperature.

It can be seen that the porosity of SRBSN-PG1 is lower than that of SRBSN-PG4, and, particularly, the porosity of SRBSN-PG4 sintered at 1800° C. is about 57%, which is higher than the porosity (about 39%) of a porous SiC material by about 18%. This result is determined to be due to the fact that the probability of the granules being maintained at a spherical shape is high because the strength of pre-sintered granules of PG4 is higher than that of pre-sintered granules of PG1.

Figure 22:
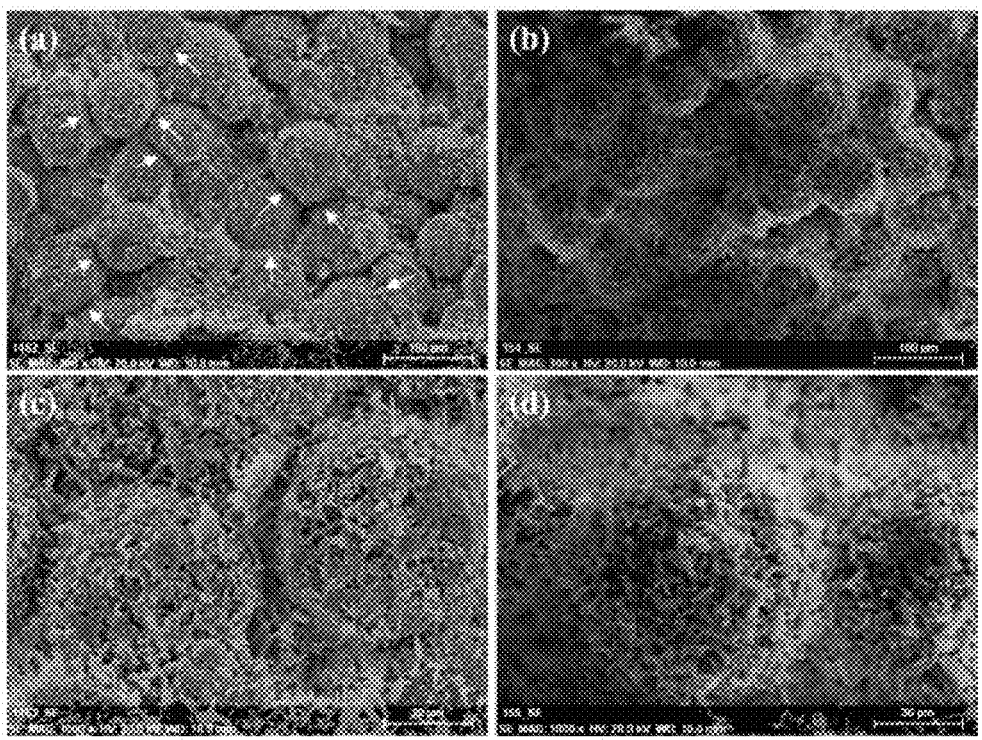
FIG. 22 shows photographs showing the microstructure of the sample of FIG. 21, observed by an electron microscope.

FIG. 22 shows photographs of the sections of SRBSN-PG1 and SRBSN-PG4 samples of FIG. 21, observed with an electron microscope. Referring to FIG. 22, in the case of PG1 having relatively low granule strength (FIG. 22 (a)), a large number of plane-contact granules attributable to the deformation or destruction of granules are observed as indicated by arrows. In contrast, in the case of PG4 having high granule strength (FIG. 22 (b)), dot contacts between granules are predominantly observed. Further, as shown in FIG. 22 (c) and FIG. 22 (d) which are high-power photographs of FIG. 22 (a) and FIG. 22 (b), it can be seen that intrinsic needle-shaped silicon nitride particles are grown without relation to pre-sintering conditions, so that strong bonds are formed between granules.

Figure 23:
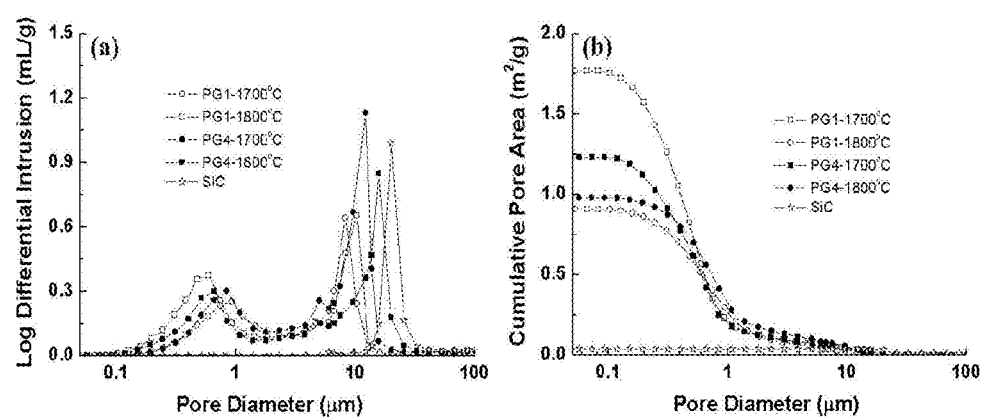
FIG. 23 shows graphs showing the results of measurement of the pore size and pore specific surface areas of the sample of FIG. 21.

FIG. 23 shows graphs showing the results of measuring the pore size and specific pore surface area of SRBSN-PG1 and SRBSN-PG4 samples. From FIG. 23 (a), it can be seen that the size of macropores of a SRBSN-PG4 sample is larger than that of macropores of a SRBSN-PG1 sample. Further, it can be seen that the maximum size of macropores of the SRBSN-PG4 sintered at 1800° C. is about 12 µm, and the maximum size of macropores of a porous SiC material as a reference sample is about 20 µm. From FIGS. 23 (a) and (b), it can be seen that the specific surface area of pores of SRBSN is controlled by micropores having a pore size of 1 µm or less. That is, as shown in FIG. 23 (a), the size of micropores in micropore peak values decreased in the order of PG1-1800° C.>PG4-1800° C.>PG4-1700° C.>PG1-1700° C., and, as shown in FIG. 23 (b), the specific surface areas thereof increased in the reverse order thereof. The specific surface area of the porous SiC material was 0.04 m$^2$/g, and the specific surface area of the SRBSN sample of PG4-1800° C. was 0.98 m$^2$/g.

Figure 24:
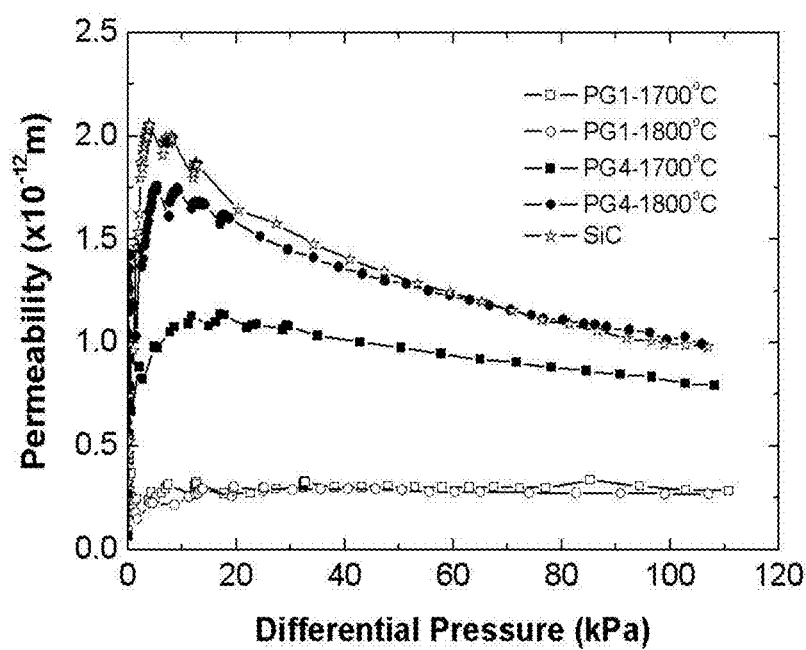
FIG. 24 is a graph comparing the air permeability of the porous SRBSN material of the present invention with that of a porous silicon carbide (SiC) material as a comparative sample.

FIG. 24 is a graph comparing the air permeability of the SRBSN sample of the present invention with that of a porous SiC material as a comparative sample. From FIG. 24, it can be seen that the SRBSN sample of PG4-1800° C. has air permeability approximately equal to that of the porous SiC material. The porosity of the SRBSN sample of PG4-1800° C. and the porosity of the porous SiC material are respectively 57% and 39%, and the size of macropores of the SRBSN sample of PG4-1800° C. and the size of macropores of the porous SiC material are respectively 12 µm and 20 µm. Therefore, it is determined that the air permeability of the SRBSN sample of PG4-1800° C. is approximately equal to that of the porous SiC material by the trade-off relationship between the porosity and the size of macropores. In the SRBSN sample of PG4-1800° C., since the SRBSN sample of PG1-1800° C. has low granule strength, spherical granules are deformed or destroyed at the time of uniaxial pressing, so that plane contacts between granules increased, with the result that the size of macropores decreased, thereby deteriorating air permeability.

As described above, according to the present invention, when Si-mixture granules are pre-sintered to increase granule strength, the pre-sintered granules are pressure-formed and then the pressure-formed product are nitrided and sintered, the Si-mixture granules can be formed into a porous sintered reaction-bonded silicon nitride having a microstructure in which macropores and micropores coexist. Particularly, according to the present invention, pre-sintered granules having maximum flowability and granule strength can be prepared under a predetermined sintering temperature condition, so that a near-net shape porous sintered reaction-bonded silicon nitride having constant porosity and shrinkage can be manufactured using the pre-sintered granules, thereby manufacturing a porous materials having the pore structure and porosity that were previously designed.

As described above, according to the present invention, a porous pre-sintered granule for porous sintered reaction-bonded silicon nitride, which can increase the air permeability and trapping efficiency of the porous sintered reaction-bonded silicon nitride by controlling the size of a pore channel such that macropores and micropores coexist, can be manufactured.

Further, since the porous pre-sintered granule of the present invention is barely deformed even at high forming pressure, its granular microstructure can be constantly maintained regardless to the kinds of general pressure-forming methods, such as uniaxial pressing, extruding, injection forming, etc., and it can be used to manufacture a porous sintered reaction-bonded silicon nitride having a near-net shape.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a porous sintered reaction-bonded silicon nitride, comprising the steps of:
   granulating a raw material comprising silicon and sintering additive including yttrium, aluminum, and at least one alkali earth metal compound;
   pre-sintering the granulated raw material at a temperature of 1300~1375° C. under an inert atmosphere to prepare porous granules;
   forming a compact with the porous granules;
   nitriding the compact under a nitridation atmosphere; and
   sintering the nitrided compact at a temperature of 1700~1900° C. under a nitrogen atmosphere.

2. The method of manufacturing a porous sintered reaction-bonded silicon nitride according to claim 1, wherein the sintering additive is included in the raw material in an amount of 2~5 wt % based on an amount required for the complete nitridation of silicon.

3. The method of manufacturing a porous sintered reaction-bonded silicon nitride according to claim 1, wherein the alkali earth metal is calcium (Ca).

4. A method of manufacturing a porous sintered reaction-bonded silicon nitride, comprising the steps of:
   granulating a raw material comprising silicon and a sintering additive including yttrium, aluminum, and at least one alkali earth metal compound;
   pre-sintering the granulated raw material at a temperature of 1300~1375° C. under an inert atmosphere to prepare porous granules, the porous granules having a yield strength of 10 MPa or more;
   forming a compact with the porous granules;
   nitriding the compact at 1350~1450° C. for 2~10 hours under a nitridation atmosphere; and
   sintering the nitrided compact at a temperature of 1700~1900° C. under a nitrogen atmosphere, wherein a shrinkage of the nitrided compact after the sintering is less than 6%.

5. The method of manufacturing a porous sintered reaction-bonded silicon nitride according to claim 4, wherein the sintering additive is included in the raw material in an amount of 2~5 wt % based on an amount required for the complete nitridation of silicon.

6. The method of manufacturing a porous sintered reaction-bonded silicon nitride according to claim 4, wherein the alkali earth metal is calcium (Ca).

7. The method of manufacturing a porous sintered reaction-bonded silicon nitride according to claim 4, wherein the shrinkage of the nitrided compact after the sintering is less than 4%.

* * * * *